Nov. 24, 1936.  W. NOBLE  2,061,807
ROCK DRILL RIFLE NUT AND METHOD OF MAKING SAME
Filed Feb. 28, 1934
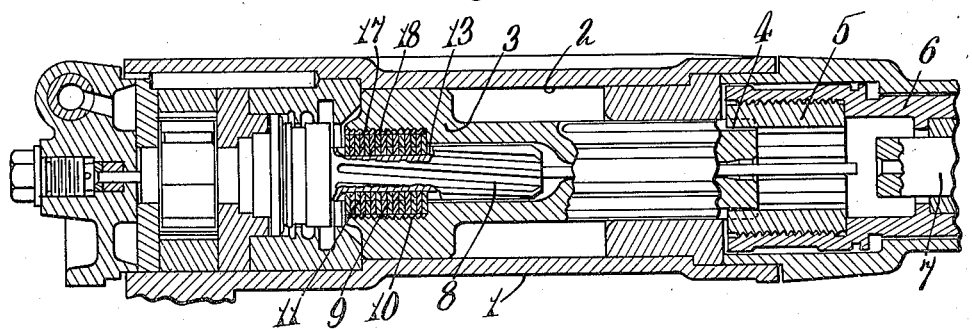
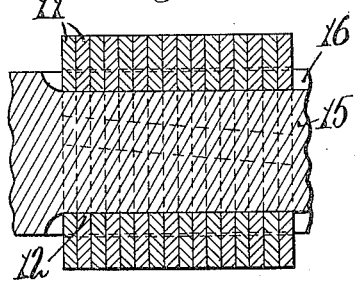 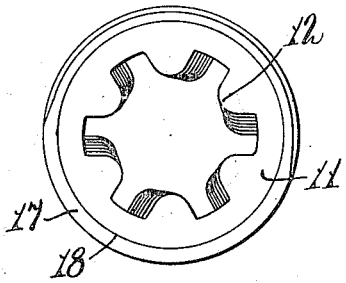
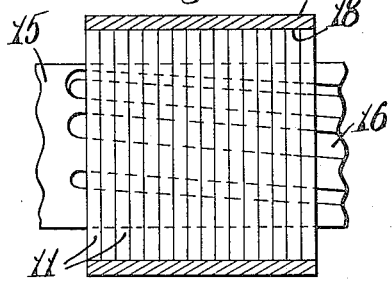 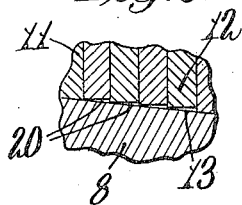
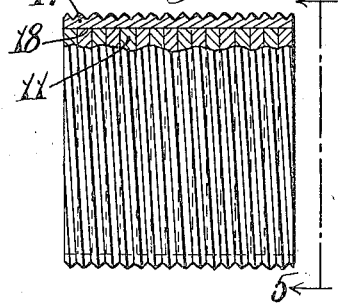
Inventor:
Warren Noble.
by Louis A. Watson
atty.

Patented Nov. 24, 1936

2,061,807

UNITED STATES PATENT OFFICE 2,061,807

ROCK DRILL RIFLE NUT AND METHOD OF MAKING SAME

Warren Noble, Michigan City, Ind., assignor to Sullivan Machinery Company, a corporation of Massachusetts Application February 28, 1934, Serial No. 713,335

6 Claims. (Cl. 29—148.2)

My invention relates to methods of manufacturing rifle nuts or similar parts, and to an improved rifle nut or similar element per se.

Rifle nuts for rock drill motors are commonly made of bronze or other similar material, and produced by a broaching process. As a result, a comparatively soft material is ordinarily used, and, in the event that there are imperfections in the metal which is being broached, structural weakness or unusable parts are both likely to occur.

From one aspect of the present invention, I contemplate the making of rifle nuts and other similar parts by a very simple process, consisting, in a preferred mode, of stamping out a number of relatively thin parts having projections designed to co-operate with the grooves in the rifle bars of the drilling motors with which they are to be used, suitably securing the stampings in proper angular relation to each other to provide stepped helical lands to co-operate with the helical grooves in the rifle bar, and suitably treating the periphery of the assembled unit to provide for its attachment in the piston or other suitable part of the drilling motor. It will, of course, be understood that the invention, in this aspect, is not confined to the mere manufacturing of rifle nuts for rock drill motors, but that it is adapted to the production of a wide variety of other analogous articles of manufacture.

From another aspect, the invention contemplates a composite rifle nut or other like structure, comprising a series of rigidly connected elements or laminae, providing stepped lands within their composite bore, and suitable securing means arranged, preferably, upon the outside of the composite unit. One very desirable embodiment comprises a unit including a series of, as it were, internally toothed discs, each turned through a small angle with respect to its predecessor, to provide stepped helical lands, the entire set being arranged within a suitable sleeve and severally welded to the sleeve and to each other, preferably through a welding operation applied at the exterior of the sleeve, the sleeve being thereafter threaded or otherwise formed for securing to the part in which the unit is to be mounted. Desirably, the discs may be formed by a stamping operation, and, being thin, may be made of material possessing characteristics of great strength and durability. By appropriate treatment, any burrs or the like, left after the stamping process, may be removed. Such a unit possesses strength, durability, and freedom from concealed inherent defects, and provides, because of the stepped construction of the lands, space for oil or other lubricant storage and to serve as dirt trapping means.

Among the objects of the invention are the provision of an improved method of constructing rifle nuts and the like. Another object of the invention is to provide an improved construction for rifle nuts or the like. A further object of the invention is to provide an improved built-up nut construction. Still another object of my invention is to provide a composite rifle nut construction, providing improved lubricating and dirt trapping features. Other objects of my invention will hereinafter appear more fully.

In the accompanying drawing there is shown for illustration one form which my invention, from its structural aspect, may assume in practice, and a number of the steps incident to the performance of its method aspect.

Fig. 1 is a central longitudinal section through a rock drilling motor in which a rifle nut constructed in accordance with the illustrative embodiment of the invention is incorporated.

Fig. 2 is an enlarged fragmentary section showing a stage in the assembly of a composite rifle nut.

Fig. 3 is a smaller view showing a further step in the manufacturing operation.

Fig. 4 is a view partially in side elevation and partially in section showing a finished nut.

Fig. 5 is an end view of a finished rifle nut, looking in the direction of the arrows in Fig. 4.

Fig. 6 is an enlarged, detail, sectional, fragmentary view, showing features of construction.

Referring to the drawing, there is shown at 1 a drilling motor having a cylinder bore 2 in which a piston 3 is reciprocable. The piston has a splined connection at 4 with a chuck nut 5 mounted within a chuck sleeve 6 within whose forward end a drill steel shank 7 extends, the drill steel being rotated by the chuck mechanism. A suitable ratchet and pawl controlled rifle bar 8 co-acts with the illustrative form of my improved rifle nut 9, which is threadedly secured at 10 in the rear end of the piston 3, in effecting rotation of the piston and thereby of the drill steel.

In the formation of my improved rifle nut, a number of thin stampings or laminae of any suitable material, as for example, alloy steels, bronze or any other material desired and suitable for the purpose, and in the form of circular discs 11 having inwardly projecting portions 12 to co-operate with the grooves 13 in the rifle bar, are formed by any suitable stamping process, preferably a cold process. Obviously annealing to remove any stresses set up may be performed if desired.

Any burrs resulting from the stamping operation may be removed prior to the next stage of the process of manufacture.

In the assembly of the rifle nut laminae or discs to make up a rifle nut unit, a series of the discs are slid upon a form member 15 having grooves 16 of like contour and curvature with the grooves of the rifle bar with which the nut is to be used. Obviously many methods of holding the then properly positioned nut elements together may be adopted, but I prefer to use a welding process, and a suitable thin sleeve 17 of suitable material, having a bore 18 snugly fitting the peripheries of the discs 11, is slid or pressed over the discs while they are positioned on the form, and the sleeve is welded to the discs in a manner to make a strong and permanent connection. Obviously, if desired, the discs might also be welded to each other, and such a result will, in some measure, accompany the welding to the sleeve.

After the welding is finished, the sleeve and disc unit, all of whose parts are now rigidly and permanently held together, may be treated in any suitable manner to permit their securing to the piston with which they are to be used. Preferably, the sleeve is simply threaded to provide the usual threaded connection with the bore in the piston.

Another method of forming the rifle nut consists of placing the series of discs together on the form member 15, holding the discs together on the form member by some suitable means, coating the discs with tin by a usual tinning process to secure the discs together as a unit, and thereafter threading the exterior of the disc unit.

Fig. 6 shows the presence of small pockets at 20 formed by reason of the fact that the discs are formed by a stamping or punching process in which the movement is perpendicular to the sheet, while the rifle bar groove 13 is helical. These small spaces serve as dirt traps and also store lubricating oil to prevent excessive wear. In the event that the material of the rifle nut is comparatively hard, any suitable treatment to remove the sharp corners may be adopted.

From the foregoing description, it will be evident that I have provided an improved and simple rifle nut construction in which broaching is unnecessary in which any material desired can be readily used, including materials not readily broached, providing certainty of the absence of hidden defects, possessed of the characteristics both of cheapness and efficiency, and promoting long life by special lubricating functions, and the trapping, in spaces where wear will be avoided, of any small fragments of an abrasive nature which might secure access to the interior of the rifle nut and rifle bar assembly.

While there is in this application specifically described one form which the invention may assume in practice it will be understood that this form is shown for purposes of illustration, and that the invention may be modified and embodied in various other forms without departing from its spirit or the scope of the appended claims. It will further be understood that the method of manufacturing the article which forms one aspect in my invention has also only been described from the illustrative angle, and that it too may be modified without departing from the scope of the appended claims.

What I claim and desire to secure by Letters Patent is:

1. As an article of manufacture, an improved rifle nut comprising a plurality of toothed stampings arranged in staggered relation with their teeth forming stepped helical lands and rigidly held together, said unit having means for holding the same in a part in which the same is to be mounted.

2. As an article of manufacture, a composite rifle nut comprising a plurality of stampings, internally toothed, and turned in staggered relation relative to each other to provide stepped lands, and having attached to the exterior thereof and holding them in rigid relation to each other a sleeve formed with holding means for engaging a member in which said nut is to be mounted.

3. As an article of manufacture, a composite rifle nut comprising a series of relatively thin plane annular members each having inward projections the elements of whose lateral surfaces are perpendicular to the planes of said members, said members disposed with their projections helically arranged to form internal stepped lands, and a sleeve attached to said members in fixed relation thereto, said sleeve having external threads.

4. A method of making rifle nuts or the like comprising stamping from relatively thin material a series of discs of appropriate internal conformation, positioning said discs in staggered relation by suitable means to cause their inner peripheries to provide one or more stepped lands, securing the discs together, and providing means for fixing of the unit at a point of use.

5. A method of making rifle nuts or the like comprising stamping from relatively thin material a series of discs of appropriate internal conformation positioning said discs by suitable means to cause their inner peripheries to provide one or more stepped lands, securing the discs together by mounting them in and attaching them to a suitable sleeve, and forming said sleeve with means for holding the unit in a working position.

6. A method of making rifle nuts or the like comprising stamping from relatively thin material a series of discs of appropriate internal conformation, positioning said discs in staggered relation by suitable means to cause their inner peripheries to provide one or more stepped lands, securing the discs together by mounting them in and attaching them to a suitable sleeve, and externally threading said sleeve.

WARREN NOBLE.